April 1, 1958 W. M. GOODALL 2,829,280

STAIR-STEP WAVE FORM GENERATOR

Filed March 5, 1953 2 Sheets-Sheet 1

INVENTOR
W. M. GOODALL
BY Hugh S. Wertz
ATTORNEY

April 1, 1958 W. M. GOODALL 2,829,280

STAIR-STEP WAVE FORM GENERATOR

Filed March 5, 1953 2 Sheets-Sheet 2

INVENTOR
W. M. GOODALL
BY Hugh S. Wertz
ATTORNEY 2,829,280
Patented Apr. 1, 1958

2,829,280

STAIR-STEP WAVE FORM GENERATOR

William M. Goodall, Oakhurst, N. J., assignor to Bell Telephone Laboratories, Incorporated, New York, N. Y., a corporation of New York Application March 5, 1953, Serial No. 340,587

4 Claims. (Cl. 307—88.5)

This invention relates to stair-step wave form generators of the type which are controlled by applied synchronizing pulses.

One object of the present invention is to provide a simple synchronized stair-step wave form generator, adapted for use in a time-division circuit for multiplex communication systems.

Another object is to construct a stair-step generator which uses inexpensive diode elements.

In accordance with the invention, the voltage across a storage condenser is incrementally changed by the pulsating operation of a diode switch in the circuit of the condenser. More specifically, the pulse output from a relatively high frequency oscillator causes the periodic actuation of a first diode switch which connects the condenser to a constant current source. Synchronizing pulses of a lower repetition rate actuate a second diode switch connected to the condenser to discharge it. The output voltage across the condenser, resulting from the incremental charging and periodic discharging of the condenser, is a stair-step wave form which is periodically repeated at the frequency of the synchronizing pulses.

Figure 1:
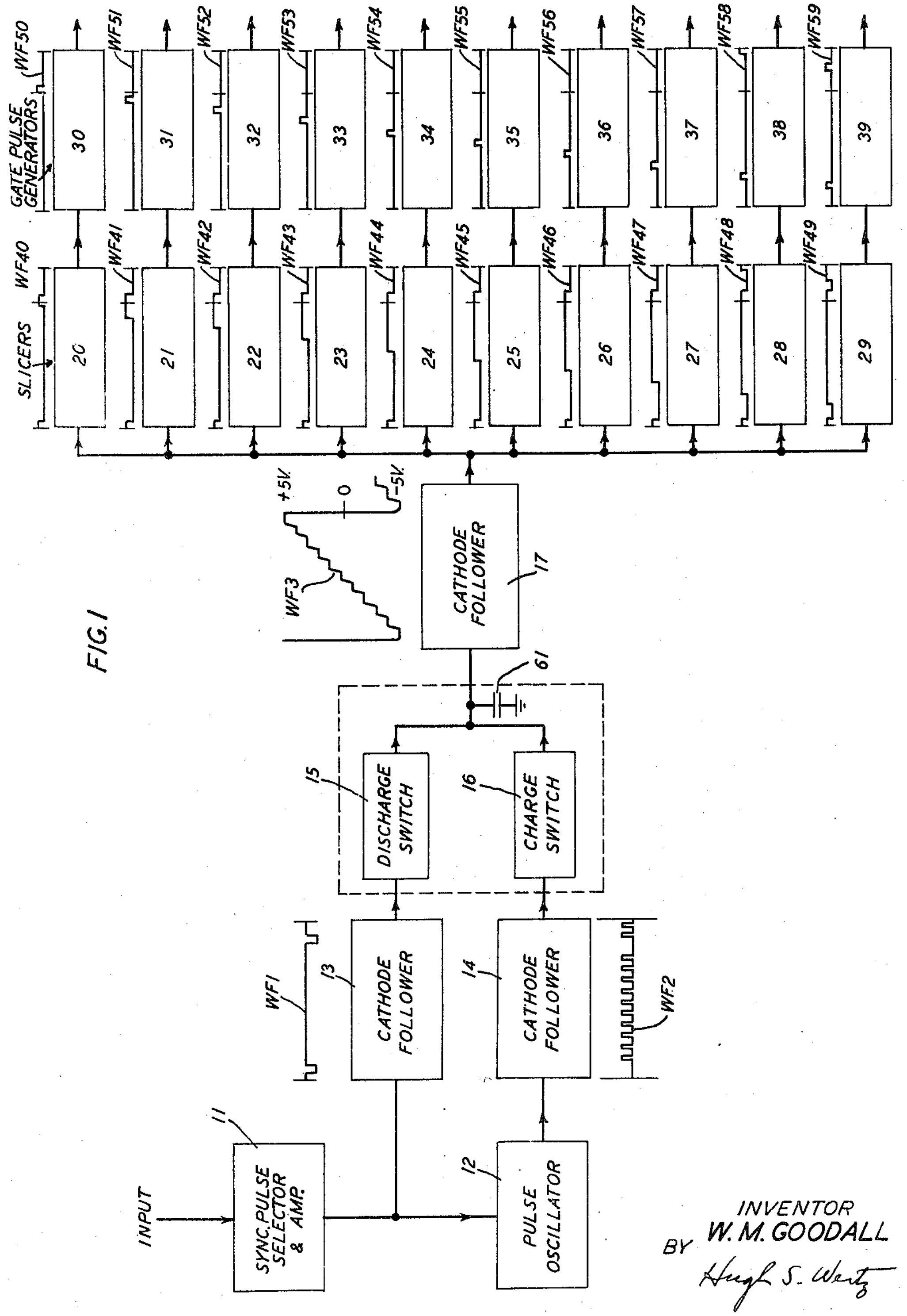
Fig. 1 is a schematic circuit diagram of a ten-channel time division system.

Referring more particularly to the drawings, Fig. 1 shows, by way of example and for purposes of illustration, a block diagram of a ten-channel time division system which may be used as a part of the receiver in a ten-channel multiplex communication system. In order to illustrate more clearly the nature of the present circuit, plots of voltages vs. time have been placed adjacent the appropriate points in the block circuit diagram of Fig. 1. In the incoming multiplex signal, synchronizing pulses are received at a fixed repetition rate, which will hereinafter be called the synchronization rate, and the time interval between successive synchronization pulses will be termed the synchronization period. Within each of the synchronization periods, each of the ten channels has a separate brief time interval allocated for signal transmission. These intervals for the various channels are substantially equal in duration and do not overlap, and the signal time intervals for each channel recur at the synchronization rate. The circuits which form the subject matter of an exemplary embodiment of the present invention are designed to form ten separate gate pulse wave forms on ten separate wire circuits, for the purpose of energizing equipment individual to each of said ten channels at the proper instants. The wave form on each separate wire circuit constitutes a series of rectangular pulses which recur at the synchronization rate and which coincide with the above-mentioned channel time intervals. The ten separate output wave forms, as illustrated at WF–50 to 59, have gate pulses which do not overlap one another, and which bear a fixed time relationship with the synchronizing pulses illustrated at WF–1.

The gate pulse outputs WF–50 to 59 are derived from the slicer wave forms as shown at WF–40 to 49. A slicer is an electrical component which has two stable output states and shifts from one state to the other at a predetermined input level. The ten slicers shown are a family of slicers, each of which shifts from one stable output state to the other at a respective different input level. Typical slicer circuits which are suitable for the present purpose are shown in my application Serial No. 203,662, filed December 30, 1950, now Patent 2,773,981, granted December 11, 1956. One way of forming the family of slicer outputs shown at WF–40 through 49 is to supply an input sawtooth wave to the family of slicers. It is apparent, however, that greater timing accuracy can be obtained by providing an input stair-step wave, such as shown at WF–3, rather than a simple sawtooth wave.

The components employed for instrumenting an appropriate stair-step wave form, coordinated with the input synchronizing signals, include an oscillator 12 and the discharge and charge switches 15, 16, respectively, shown in the lefthand portion of Fig. 1. The input stage 11, which may be coupled to the input multiplex signal in parallel with the receiving equipment individual to each channel, selects and amplifies the synchronizing pulses from the input signal, and suppresses the other signal information. These amplified synchronizing pulses as shown at WF–1 periodically block the oscillator 12 momentarily, and also operate the discharge switch 15, following the amplification of the pulses by the cathode follower 13. The oscillator 12 creates a new train of pulses of higher repetition rate than the input synchronizing pulses, which operate the charge switch 16 after amplification by the cathode follower 14. The discharge switch 15 periodically discharges the condenser 61 to the desired level while the oscillator is disabled. Following this discharge, the periodic actuation of the charge switch 16 by pulses from the oscillator 12 causes the incremental charging of the condenser to form the stair-step wave form shown at WF–3. The pulse oscillator 12 is adjusted to generate 10 pulses for every synchronizing pulse. The resulting wave form WF–3, which appears at the high impedance input to the cathode follower 17, is a 10-step wave form which is repeated in its entirety at the periodicity of the input synchronizing pulses. With each of the slicers 20 to 29 having a critical input level corresponding to the difference between two levels of the stair-step wave form WF–3, their transitions from one stable state to another are accurately timed, and the output pulses from the pulse generators 30 to 39 are precisely timed with respect to the input synchronizing pulses.

Figure 2:
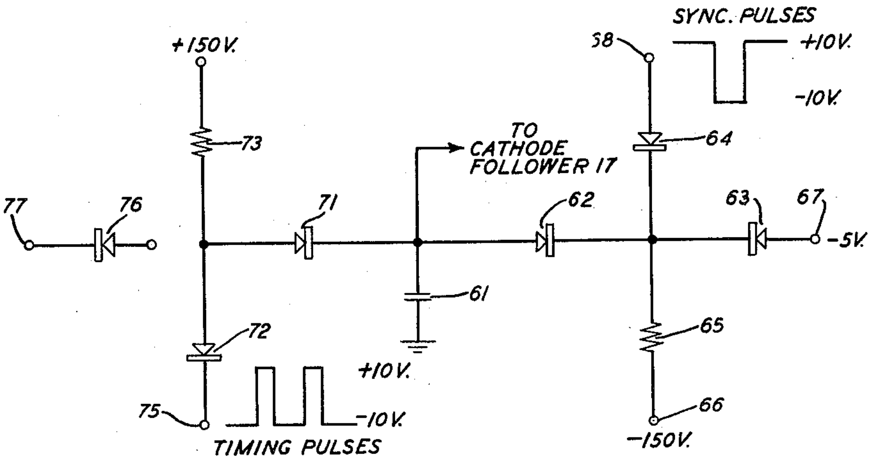
Fig. 2 is a circuit diagram of the stair-step wave form generator in accordance with the invention shown at section II in the block diagram of Fig. 1.

Referring to Fig. 2, the circuital arrangement to the right of the grounded storage condenser 61 is the discharge switch while that to the left is the charge switch as shown at 15 and 16, respectively. These diode switch circuits are similar to those shown in Patent No. 2,576,026, granted to L. A. Meacham on November 20, 1951, and No. 2,258,732, granted to A. D. Blumlein et al. on October 14, 1941, and a detailed description of the theory of operation of this type of switch can be found in these patents.

In the drawings and in the course of the description of the circuits, specific values of electrical components and voltage levels are given in certain instances to illustrate one set of values which has proved satisfactory. These are given, however, only for purpose of illustration and not by way of limitation.

Proceeding to a detailed consideration of the discharge switch, it comprises the three diodes 62, 63, and 64, the current bias unit made up of resistance 65 and voltage source 66, and the voltage bias terminal 67. The rectifying diodes are shown conventionally with the arrow pointing in the low resistance direction for positive current flow, and, for convenience, the side of the diode from which the arrow points will be termed the positive side and the polarity of the side of the diode shown as a bar will be termed the negative side. The negative sides of the three diodes are connected together to the current bias unit, and the positive sides of the diodes 62, 63 and 64 are connected to the ungrounded side of the condenser 61, to the −5 volt bias terminal 67, and to the control electrode 68 which receives the synchronizing pulses from the cathode follower 13, respectively. When the voltage on the control electrode is well positive (no synchronizing pulse) with respect to the fixed bias 67 and the voltage on the condenser 61, the resistance of the diodes 62 and 63 is high and the resistance of the diode 64 is low. Consequently, substantially all of the current flowing in the resistance 65 flows through diode 64. Using germanium diodes, under the conditions stated above, the resistance of the diode 64 is 200 to 300 ohms, while that of diodes 62 and 63 is approximately 600,000 ohms to one megohm. Just before the negative synchronizing pulse is applied to terminal 68, at the end of the train of ten pulses to the charge switch, the voltage on the condenser 61 is +5 volts as shown at WF–3 in Fig. 1. After the negative synchronizing pulse is applied to electrode 68, current flows from the condenser 61 to the negative 150 volt supply 66 through the diode 62 and the resistance 65. This action continues until the condenser voltage has discharged to −5 volts, at which point the current switches to diode 63, and the discharge of the condenser stops at a voltage equal to the bias voltage on electrode 67, in this case a voltage of −5 volts. The duration of the synchronizing pulse is somewhat greater than the time required for condenser 61 to discharge through resistance 65, and the voltage of the condenser is held at the bias voltage on the electrode 67 until the synchronizing pulse ends. When the synchronizing pulse is removed, the condenser is connected to the diode junction by means of the high (about 1 megohm) back resistance of the diode 62. Except for this connection the condenser is essentially free from the action of the condenser discharge switch.

The condenser charge switch includes the diode 71 connected to the ungrounded side of the storage condenser 61, and another diode 72 connected to the diode 71 with their sides of like polarity together. The timing pulse output from the pulse oscillator 12 is coupled to the terminal 75 on the opposite side of the diode 72. A current biasing unit, made up of the +150 volt terminal 74 and the resistance 73, is connected to the intermediate point of the diodes 71 and 72. It can be seen that in the absence of the positive timing pulses on terminal 75, the current through the resistance 73 flows through the diode 72 inasmuch as the resistance of this diode 72 is low and that of diode 71 is high. Under these conditions, the condenser 61 is essentially free of the condenser charge switch. When a positive timing pulse is applied to terminal 75, making it more positive than the ungrounded side of the condenser 61, the current switches from diode 72 to diode 71, and the current flowing in the resistance 73 flows into the condenser. After a short interval, the timing pulse ends and the current is switched back to the control circuit. During the time that the condenser is being charged the current is determined largely by the resistance 73 which acts essentially like a constant current supply. This process is repeated for each of the train of 10 timing pulses shown at WF–2 in Fig. 1.

Since the timing pulses are of the same duration and the charging current is essentially the same for all pulses, the voltage change is very nearly the same for each timing pulse. It will be noted that for this application the voltage change is determined by the pulse shape and duration and by the magnitude of the current flow. This is in contrast to the condenser discharge switch which discharges the condenser to a fixed voltage provided only that the pulse is applied for a sufficiently long time.

For other applications the diode 76 can be connected to the common junction of diodes 71 and 72. It will be noted that two complete switches are provided under these conditions. Either can be used to charge (or discharge) the condenser either by small increments of voltage or to a fixed voltage, depending upon the size of the resistance between the crystal junctions and the power supply and upon the length of the switching pulse. To illustrate another use of the additional diode 76, it may be noted that if a fixed voltage of plus five volts were applied to the outer terminal 77 of the diode 76 with its other side connected to the common junction of diodes 71 and 72, this would provide a top limit beyond which the condenser could not be charged.

Figure 3:
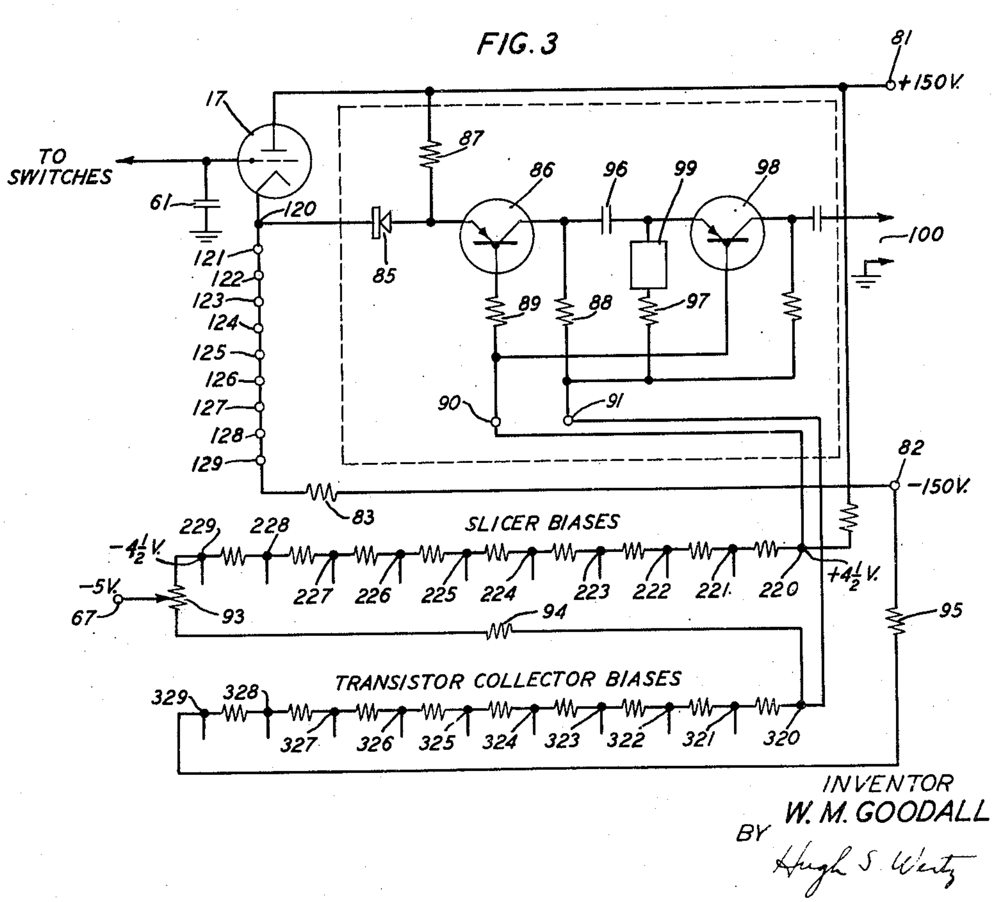
Fig. 3 is a circuit diagram of the cathode follower and of one of the slicers and gate pulse generators shown in Fig. 1.

The circuits shown in Fig. 3 are shown in the block diagram of Fig. 1 as the cathode follower 17, the slicer 20 and the gate pulse generator 30. The plate voltage for the cathode follower 17 is applied from the positive supply 81 and the negative supply 82 across the load resistance 83.

The slicer circuit is made up of the diode 85, the transistor 86, the resistance 87 in the emitter circuit, the transistor load resistance 88, and the resistance 89 in the transistor base circuit. The operation of this amplitude-sensitive doubly-stable circuit is set forth in detail in my Patent No. 2,773,981, granted December 11, 1956, which was cited above. The transistor collector voltage of approximately 30 to 40 volts is applied across terminals 90 and 91, with the collector terminal 91 held negative with respect to the base terminal 90. The output from the slicer is obtained across the load resistance 88. The inclusion of the resistance 89 in the base circuit produces a negative resistance between the emitter of transistor 86 and terminal 90. When the voltage at the cathode of the cathode follower 17, which is substantially the same as that applied to the grid of the tube, is below the bias voltage at point 90, the current in the resistance 87 flows to the negative plate voltage supply 82 through the resistance 83. When the voltage on the cathode is above the bias voltage at 90, the current flows to the bias point 90 and thence to the negative voltage supply 82 through the emitter section of the transistor. The negative resistance action causes the current to snap suddenly from one condition to the other as the voltage on the cathode changes through the bias point. The wave form produced across resistance 88 is illustrated at WF–40 in Fig. 1. The other terminals for connecting the slicers 21 to 29 are indicated in Fig. 3 at terminals 121 to 129, 221 to 229 and at terminals 321 to 329.

To appreciate the relationship between the stair-step wave form WF–3 and the family of slicer outputs WF–40 to WF–49, it should be noted first that the slicer bias voltages at bias terminals 220 to 229 correspond to the center of the risers in the stair-step wave form WF–3, and secondly that the slicers 20 to 29 have their output voltage jump from one level to another when the input to the cathode follower 17 is equal to the slicer bias voltage at point 90. Thus, with the one volt voltage steps of WF–3 from −5 volts to +5 volts, and the one volt voltage steps of the slicer bias terminals from +4½ volts at terminal 220 to −4½ volts at terminal 229, it is clear that for every current increment applied to condenser 61 and resulting in an increase in its voltage, a transition occurs in the output of one of the slicers. These successive output transitions can be noted in the individual output voltage vs. time plots WF–40 to 49 appearing immediately above the particular slicer to which it appertains.

To stabilize the relative voltages noted above, the rheostat 93 has its adjustable center point connected to the same —5 volt bias terminal 67 which controls the discharged voltage of the condenser 61 as shown in Fig. 2. The upper portion of the resistance 93 provides ½ voltage difference to a value of approximately —4½ volts at terminal 229. The resistances between the terminals 220 to 229 provide the 1 volt bias voltage steps from the —4½ volts at terminal 229 to the +4½ volts at terminal 220. The resistor 94 provides the 30 to 40 volt drop desired between base and collector of the transistor 86 and the resistances between the collector bias terminals 320 to 329 provide the one volt steps so that the individual collector biases have the same voltage differential with respect to the corresponding slicer bias applied to the respective transistor base. The resistance 95 completes the voltage drop to the negative voltage supply terminal 82.

The gate pulse producer is shown in simple form as a differentiating circuit made up of the condenser 96 and the resistance 97 together with the input impedance of the transistor amplifier stage 98. A suitable anti-resonant circuit 99 including appropriate inductance elements can be added to the differentiating circuit in series with the resistance 97 to square up the output pulse. The negative pulse produced by differentiation at the time of the condenser discharge is suppressed by the emitter section of the transistor 98 which is cut off at this time. The positive pulse appears at the output terminals 100, and the pulses for the various gate pulse generators 30–39 occur at times indicated by WF–50 to 59 and correspond to the time position of the positive transistion in the various slicers. From an over-all view of the operation of the device, therefore, it can be seen that the time interval between successive synchronizing pulses has been divided into ten time periods represented by the repetitive, non-overlapping gate pulses at ten separate output points as shown in WF–50 to WF–59.

Although the present circuits are particularly suitable for use in multiplex communication receivers or transmitters, their utility is by no means restricted to this field. It is to be understood that the above-described arrangements are illustrative of the application of the principles of the invention. Numerous other arrangements may be devised by those skilled in the art without departing from the spirit and scope of the invention.

What is claimed is:

1. A stair-step wave form generator comprising a storage condenser having one side maintained at a fixed voltage level, charge and discharge switches connected to the other side of the condenser; said discharge switch comprising three diodes having their sides of a predetermined like polarity connected to a common point, a current source connected to said common point, the other sides of said three diodes being respectively connected to said condenser, a source of synchronizing pulses of a given repetition rate, and a fixed biasing voltage; and said charge switch comprising two additional diodes having their sides of like polarity opposite to said predetermined polarity connected together and to a second current source, and the other sides of said two additional diodes being respectively connected to said condenser and to a source of timing pulses of a higher repetition rate than said synchronizing pulses.

2. A stair-step wave form generator comprising a storage condenser having one side maintained at a fixed voltage level, charge and discharge switches connected to the other side of said condenser; said discharge switch comprising three diodes having their sides of a predetermined like polarity connected to a common point, a current source also connected to said common point, the other side of one of said three diodes being connected to said condenser, a source of synchronizing pulses of a given repetition rate being connected to the other side of another of said diodes, and a fixed biasing voltage being connected to the other side of the third one of said diodes; and said charge switch comprising two additional diodes having their sides of like polarity opposite to said predetermined polarity interconnected, a second current source coupled to the interconnection between said two last-mentioned diodes, the other side of one of said two additional diodes being connected to said condenser, and a source of timing pulses having a higher repetition rate than that of said synchronizing pulse source being connected to the other side of the other one of said two additional diodes.

3. A stair-step wave form generator comprising a storage condenser, a substantially constant current source, means including a first diode switch for applying current from said current source to said condenser, means for applying pulses to enable said first diode switch at a preassigned pulse repetition rate, means including a second diode switch for discharging said condenser, said second diode switch including three diodes and a second substantially constant current source connected to a common point, and means for applying pulses to enable said second diode switch at a pulse repetition rate which is less than one-half of said preassigned pulse repetition rate.

4. In a stair-step wave form generator, a first source of recurring pulses having a predetermined repetition rate, a second source of recurring pulses of a higher repetition rate, a storage condenser, means including a first diode switch connected to said first source of pulses for periodically fixing the voltage on said condenser, a source of constant current, and means for applying increments of current from said current source to said condenser, said last-mentioned means including a second diode switch having a polarity with respect to said condenser opposite to that of said first diode switch, said second diode switch being enabled by said second source of pulses.

References Cited in the file of this patent

UNITED STATES PATENTS

| | | |
|---|---|---|
| 2,258,732 | Blumlein et al. | Oct. 14, 1941 |
| 2,420,516 | Bischoff | May 13, 1947 |
| 2,450,360 | Schoenfeld | Sept. 28, 1948 |
| 2,466,959 | Moore | Apr. 12, 1949 |
| 2,474,040 | Day | June 21, 1949 |
| 2,535,303 | Lewis | Dec. 26, 1950 |
| 2,548,795 | Houghton | Apr. 10, 1951 |
| 2,602,918 | Kretzmer | July 8, 1952 |